United States Patent [19]

Youngblood

[11] Patent Number: 4,980,820
[45] Date of Patent: Dec. 25, 1990

[54] INTERRUPT DRIVEN PRIORITIZED QUEUE

[75] Inventor: Loyal D. Youngblood, Austin, Tex.

[73] Assignee: International Business Machines Corporation, Armonk, N.Y.

[21] Appl. No.: 433,924

[22] Filed: Nov. 9, 1989

Related U.S. Application Data

[63] Continuation of Ser. No. 154,486, Feb. 8, 1988, abandoned, which is a continuation of Ser. No. 706,805, Feb. 28, 1985, abandoned.

[51] Int. Cl.$^5$ .................. G06F 13/14; G06F 13/20; G06F 13/24; G06F 13/26
[52] U.S. Cl. ........................ 364/200; 364/241.2; 364/241.3; 364/238.5
[58] Field of Search ... 364/200 MS File, 900 MS File

[56] References Cited

U.S. PATENT DOCUMENTS

| | | | |
|---|---|---|---|
| 3,789,365 | 1/1974 | Jen et al. | 364/200 |
| 3,925,766 | 12/1975 | Bardotti | 364/200 |
| 3,996,564 | 12/1976 | Kerrigan et al. | 364/200 |
| 4,047,161 | 9/1977 | Davis | 364/200 |
| 4,067,059 | 1/1978 | Derchak | 364/200 |
| 4,075,691 | 2/1978 | Davis | 364/200 |
| 4,096,564 | 6/1978 | Inose et al. | 364/200 |
| 4,145,735 | 3/1979 | Soga | 364/200 |
| 4,215,397 | 7/1980 | Hom | 364/200 |
| 4,215,398 | 7/1980 | Burkett et al. | 364/200 |
| 4,228,495 | 10/1980 | Bernhard et al. | 364/200 |
| 4,271,468 | 6/1981 | Christensen | 364/200 |
| 4,371,932 | 2/1983 | Dinwiddie | 364/200 |
| 4,394,727 | 7/1983 | Hoffman et al. | 364/200 |
| 4,428,043 | 1/1984 | Catiller et al. | 364/200 |
| 4,488,258 | 12/1984 | Struger et al. | 364/900 |
| 4,519,028 | 5/1985 | Olsen | 364/200 |
| 4,553,202 | 11/1985 | Trufyn | 364/200 |
| 4,628,446 | 12/1986 | Hoffner | 364/900 |

OTHER PUBLICATIONS

Specification of Emulex Communxcharge Model DS01, Emulex Corporation, Nov. 1984.
Intel Corporation, "Microcontroller's User's Manual", No. 210359-001, Chapters 6-9.
Intel Corporation's "Microcontroller Handbook", No. 210918-003, Chapters 7-11.

Primary Examiner—David Y. Eng
Attorney, Agent, or Firm—Wayne P. Bailey; Curtis G. Rose; Maurice H. Klitzman

[57] ABSTRACT

An interrupt driven digital processing system is disclosed including routines for servicing interrupt requests received from a plurality of interrupt sources. The interrupt servicing routines each interrupt regular processing within the system and perform predetermined work items required to immediately satisfy the received interrupt request. The active servicing routine then identifies and queues individual work items that must be performed to completely satisfy the received interrupt request, but that can be performed at a future time without affecting system performance. Regular processing is then reinstated and the queued work items are executed. By this means, regular processing is interrupted for a minimum amount of time while servicing individual interrupt requests. Also, the work items in queue are prioritized for execution during regular processing in order to optimize the performance of the digital processing system. The disclosed preferred embodiment is a digital communications adapter for organizing communication between a host processor and a plurality of input/output devices.

13 Claims, 16 Drawing Sheets

INTERRUPT DRIVEN PRIORITIZED QUEUE

This application is a continuation of application Ser. No. 07/154,486, filed on Feb. 8, 1988, now abandoned, which is a continuation of application Ser. No. 706,805, filed on Feb. 28, 1985, now abandoned.

TECHNICAL FIELD

This invention relates to interrupt handlers in digital processing systems.

BACKGROUND

In a typical digital processing system responsive to a plurality of interrupt requests generated by a plurality of interrupt sources, each interrupt request causes the system to cease regular processing and to perform a unique series of processing steps or work items in order to satisfy that particular interrupt request. The initiation of each unique series of work items is done by what is termed in the art, an interrupt handler.

In a typical prioritized interrupt system, the interrupt sources are each given a predetermined priority level ranging from high priority to relatively low priority. An interrupt request of a high priority can interrupt regular processing as well as the processing of an interrupt request of a lower priority. Conversely, an interrupt request of low priority can interrupt regular processing but cannot interrupt the processing of an interrupt request of equal or higher priority.

As is often the case, each individual work item in the series of work items required to be performed to completely satisfy a given interrupt request may not carry the same urgency as the instigating interrupt request. For example, in a data processing system including a keyboard device with a serial interface between the keyboard and a data processor, the striking of a particular key will send a keyboard frame, comprising a series of individual bits, from the keyboard to the data processor. The receipt of each keyboard frame includes an interrupt request which initiates an interrupt servicing routine that performs the following steps: first, the data pin is read and the bit value is stored; second, the frame bit counter is incremented; third, the frame bit counter is read to determine if an entire frame has been received; fourth, if an entire frame has not been received, preparation is made to wait for subsequent bits, the receipt of which requires the repetition of steps one through three; fifth, if an entire frame has been received, the frame is processed for use by the data processor. Processing the keyboard frame for use by the data processor typically includes the steps of: determining if the frame is a valid frame; determining if the information in the frame contains basic commands such as "resend", "system reset", or "set system trap"; initiating an audible keystroke "click"; and finally, sending the frame to the data processor. In addition, a prudently designed system will be able to report device errors should they occur during the processing of a keyboard frame in order to facilitate servicing the system. While these steps are being performed, interrupt requests of equal or lower priority are disabled.

Of the steps required to completely satisfy a keyboard interrupt request, only the first few require immediate attention. The other can occur at a time in the future without affecting the performance of the interrupt handler. By requiring the completion of all steps before returning control back to regular processing, a conventional interrupt handler interrupts regular processing for much longer than is actually necessary. Since an interrupt servicing routine cannot be interrupted by another interrupt request of equal or lower priority, this results in inefficient operation of the interrupt driven system.

A second problem with existing interrupt handlers is that digital processing systems built using existing hardware are often limited to using a fixed number of interrupt sources as defined by the hardware. Also, the hardware often fixes the number of priority levels assignable to the individual interrupt sources.

Certain applications of interrupt driven data processing systems would realize improved performance if the execution of individual work items required to satisfy individual interrupt requests could be organized to optimize a particular system requirement. For example, in a communications adapter with limited local storage, rather than performing work items in series in response to random, asynchronous interrupt requests, it would be beneficial to organize the work items to place a high priority on work items that transmit data from adapter storage, and to place a low priority on work items that accept data into adapter storage. In this manner, a special system requirement, i.e., conserving local storage, would be satisfied and system performance would be optimized.

Yet another problem with conventional interrupt handlers is that some work items required to handle a first interrupt request are often the same as the work items required to handle a second interrupt request. Storing these common work items in each interrupt servicing routine results in a waste of storage. For example, in a communications adapter for accepting data from several sources for application to a single host, each data source would be capable of initiating an interrupt servicing routine for transferring data from that individual source to the host. Each interrupt servicing routine would contain a work item wherein data is buffered for transmission to the host. Rather than repeating this work item in each interrupt servicing routine, it would be much preferable to identify a single generic work item to be performed to buffer data for the host regardless of source. This would result in more efficient use of storage.

SUMMARY OF THE INVENTION

The present invention solves the aforementioned problems present in conventional interrupt handlers by providing an improved interrupt handler having a first stage responsive to individual interrupt requests. The first stage suspends regular processing in response to interrupt requests, performs those work items that require immediate attention, and then identifies and queues individual work items that may be performed at a future time without affecting system performance. Regular processing is then reinstated and the identified individual work items are performed during regular processing.

This improved interrupt handler disables interrupt requests of a given priority for the minimum amount of time while servicing an interrupt request of the same or higher priority.

In addition, individual work items in the work item queue may be performed at different times as intermediate processing steps to satisfy more than one interrupt request. Since some work items are applicable to satisfy several different interrupt requests and since each work item is stored only once, storage space is minimized.

Also, the work item queue can itself be prioritized to ensure the performance of certain work items before other work items. By this means a particular interrupt driven system can be optimized for a particular application.

In the preferred embodiment, a hardware system with fixed number of interrupt sources and a fixed number of priorities assignable to those sources is used to construct a work item queue having an arbitrary number of work items with an arbitrary number of priority levels assignable to each work item.

In light of the foregoing, it is a primary object of the invention to provide an interrupt handler that holds off interrupt request servicing for a minimum amount of time while servicing an interrupt request of equal or higher priority.

Another object of the invention is to provide an interrupt handler capable of performing noncritical work items for satisfying a particular interrupt request at a time other than when regular processing is suspended.

Yet another object of the invention is to provide an interrupt handler capable of identifying and performing individual work items in satisfaction of individual interrupt requests to optimize an interrupt driven system for a particular application.

These and other objects and features of the invention will become apparent from the following detailed description in which the preferred embodiment is set forth with reference to the accompanying drawing.

DETAILED DESCRIPTION OF THE PREFERRED EMBODIMENT

Figure 1:
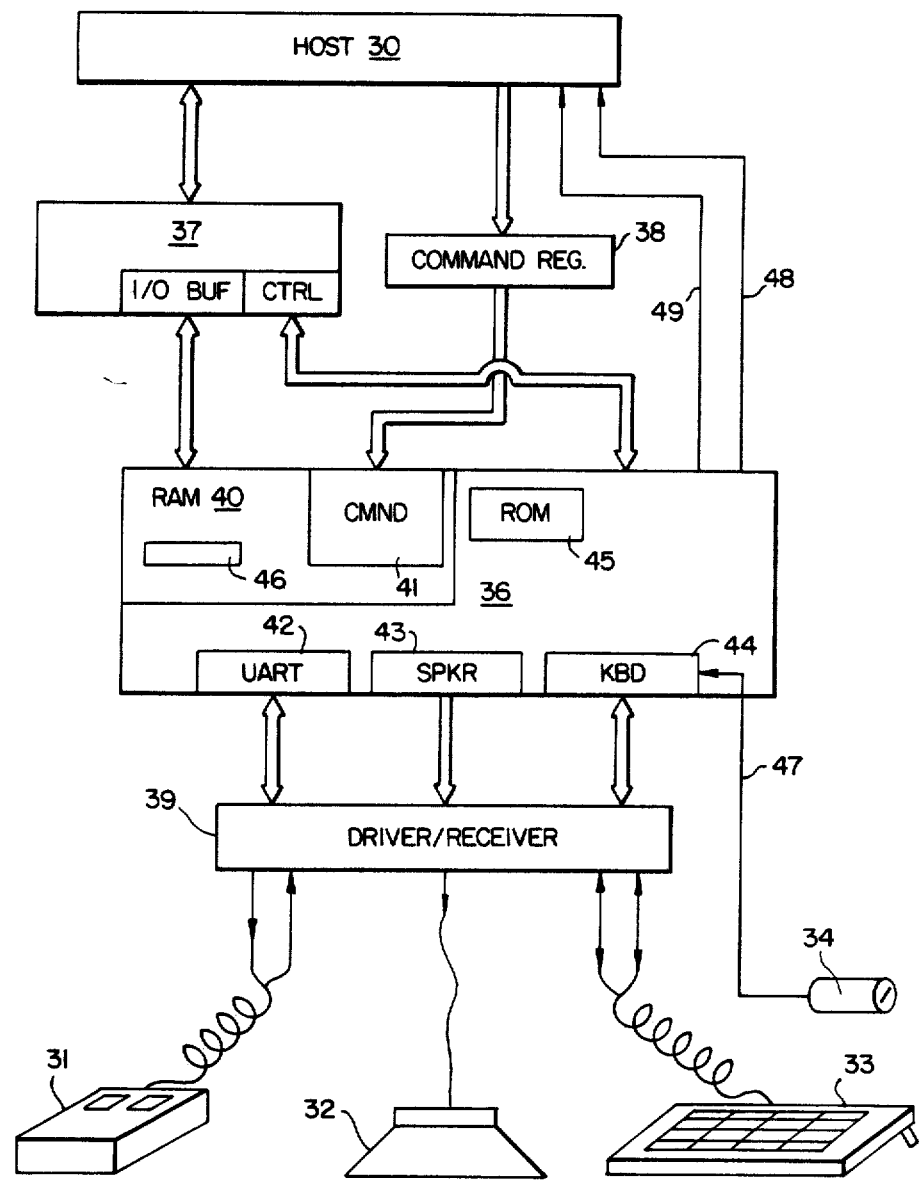
FIG. 1 is a hardware communications adapter embodying the present invention.

Referring to FIG. 1, a communication adapter is disclosed which embodies the subject invention. Generally, the communications adapter controls data communication between host processor 30 and peripheral input/output devices such as mouse 31, speaker 32, keyboard 33, and key lock switch 34. Keylock switch 34 is connected to microcontroller 36 by keylock switch line 47. The adapter comprises microcontroller 36, peripheral interface circuit 37, command register 38 and device drivers/receivers 39.

Microcontroller 36 can be, for example, a 8051 type microcontroller manufactured by Intel Corporation of Santa Clara, California and peripheral interface circuit 37 can be, for example, an 8255 type peripheral interface circuit also manufactured by Intel Corporation.

Microcontroller 36 is a dedicated microprocessor based system including RAM 40, ROM 45, and universal asynchronous receiver/transmitter (UART) 42. Microcontroller 36 is programmed to provide communications ports 43 and 44 used to communicate with speaker 32 and keyboard 33, respectively. Port 44 also communicates with keylock switch 34 through keylock switch line 47. RAM 40 includes command buffer 41 for receiving host commands from command register 38. The programs disclosed hereinafter reside in ROM 45 and microcontroller 36 is capable of initiating system trap and system reset functions through lines 48 and 49, respectively.

The operation and architecture of the 8051 microcontroller is described in Intel Corporation publication No. 210359-001 entitled "Microcontroller User's Manual" which is expressly incorporated herein by reference by way of background material.

In operation, microcontroller 36 is susceptible of interrupt requests from a total of five sources with each source assignable to one of either a high priority level or a low priority level. When an interrupt request is received, regular processing within microcontroller 36 is suspended until the interrupt is serviced. A high priority interrupt can suspend regular processing or the processing of any low priority interrupt but cannot suspend the processing of another high priority interrupt. In contrast, a low priority interrupt can suspend regular processing but cannot suspend the processing of any interrupt.

Figure 2:
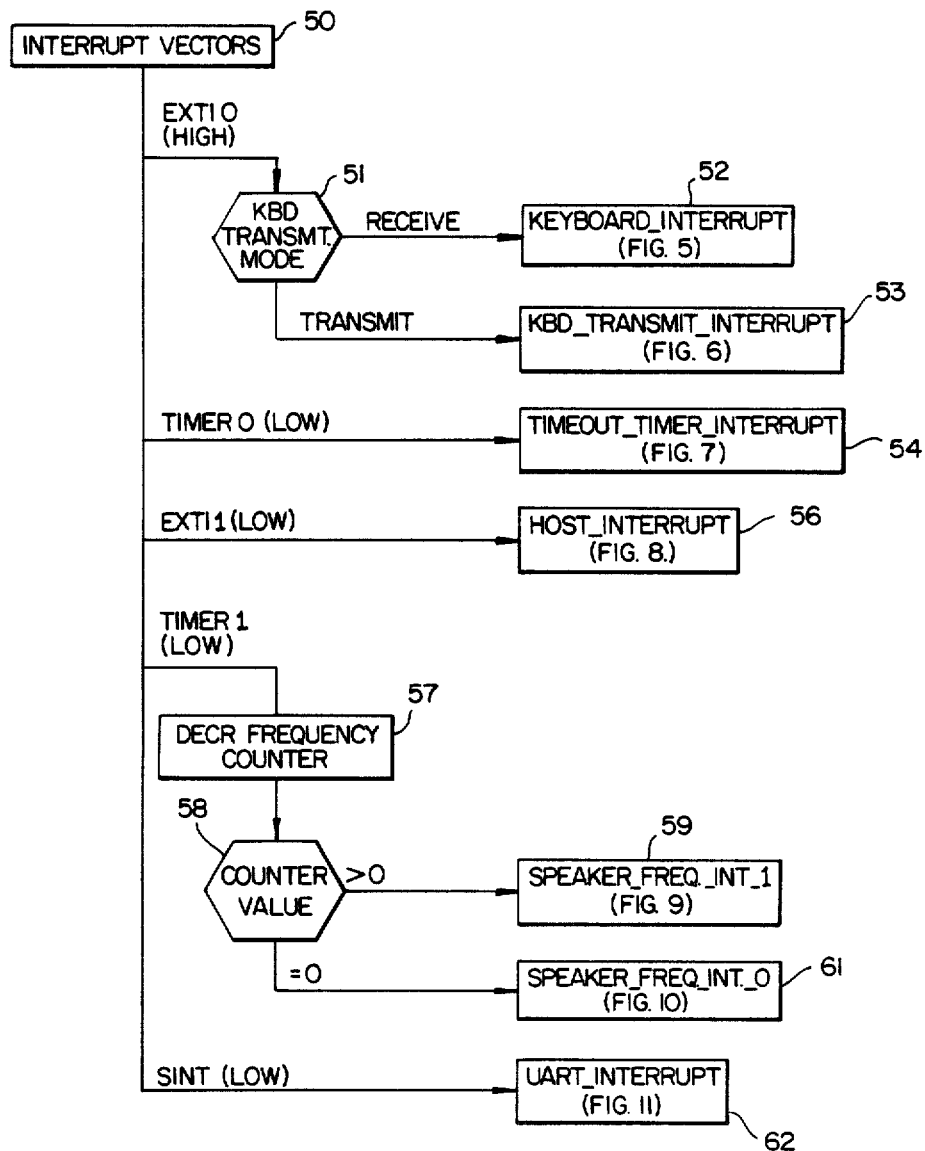
FIG. 2 is a flow chart depicting the flow of control in response to interrupt requests in the circuit of FIG. 1.

In the preferred embodiment, the interrupt requests are initially conditioned by the program depicted in FIG. 2. The five interrupt requests are detected in a known manner by interrupt vectors 50. Interrupt EXTI0 is given a high priority and is accepted from the keyboard. Interrupt TIMER0 is given a low priority and is generated upon overflow of a timer (not shown) internal to microcontroller 36 (FIG. 1). Interrupt EXTI1 is given a low priority and is accepted from host 30 (FIG. 1). Interrupt TIMER1 is given a low priority and is generated upon overflow of a different timer (not shown) internal to microcontroller 36. Finally, interrupt SINT is given a low priority and is accepted from mouse 31 via UART 42 (FIG. 1).

Figure 3:
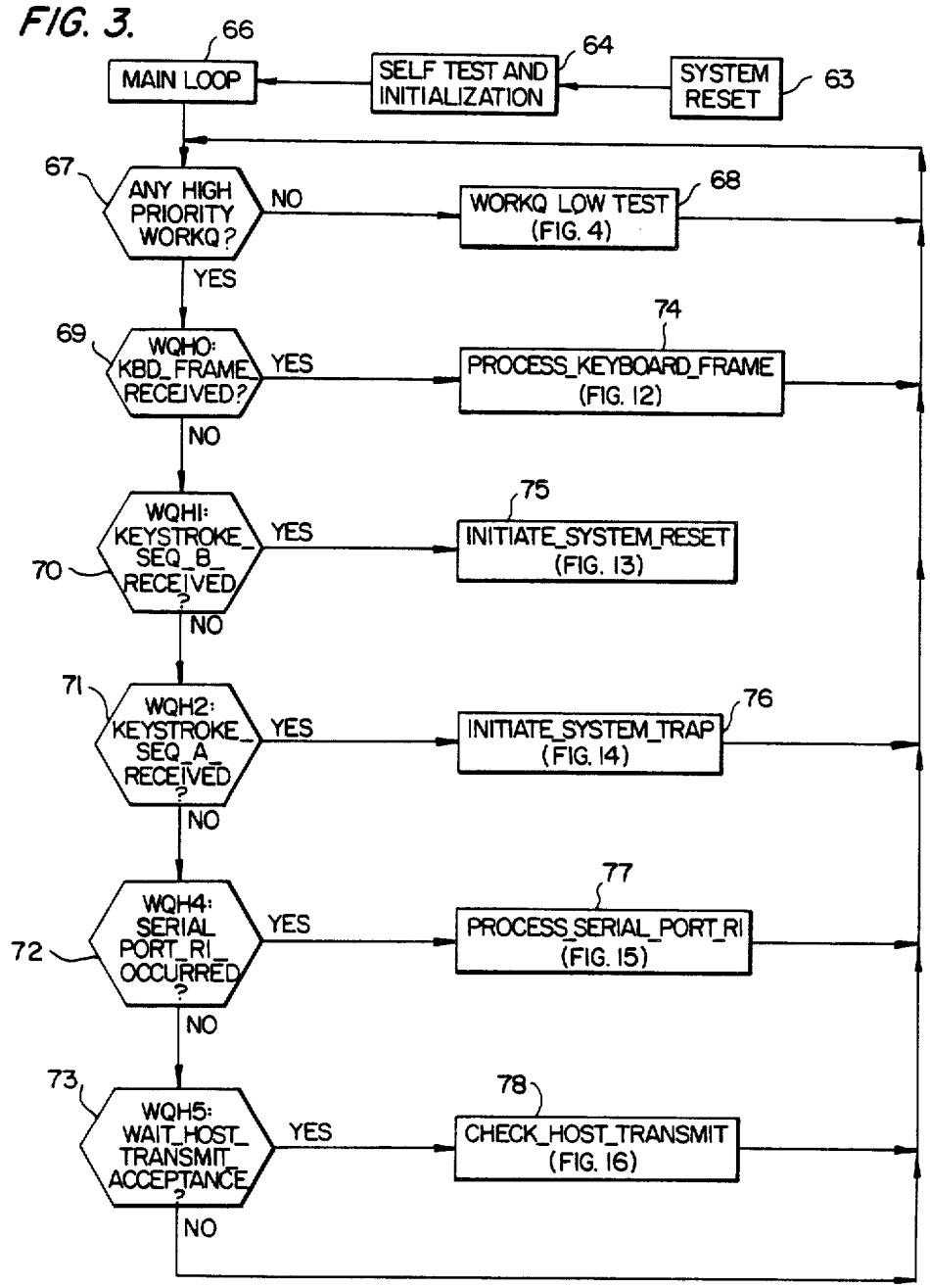
FIG. 3 is a flow chart of the flow of control in the main control loop during normal processing in the circuit of FIG. 1.
Figure 4:
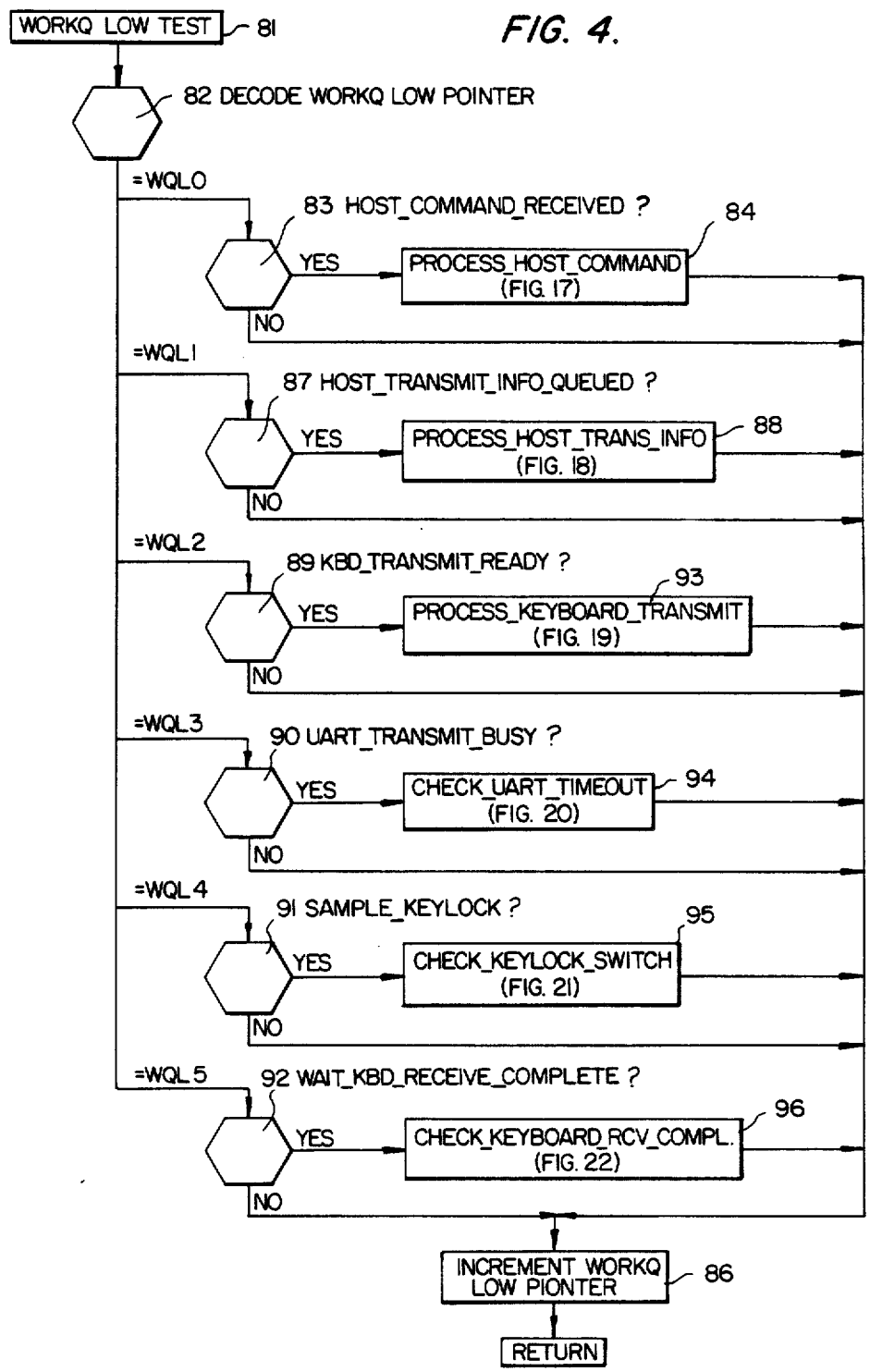
FIG. 4 is a flow chart of the flow of control during the processing of low priority work items detected in FIG. 3.

When block 50 of the program of FIG. 2 detects an interrupt request, the contents of a program counter are pushed onto stack memory and regular processing is suspended while the proper interrupt servicing routine is executed. Regular processing, as defined within the context of the preferred embodiment, is shown in FIGS. 3 and 4 and will be described in detail below.

Referring to FIG. 2, if block 50 detects the high priority interrupt EXTI0, control is transferred to decision block 51 where the keyboard transmit mode is sensed. If data is to be received from the keyboard, control is transferred to block 52 to execute the program steps shown in FIG. 5. If data is to be transmitted to the keyboard, control is transferred to block 53 to execute the program steps shown in FIG. 6.

Figure 7:
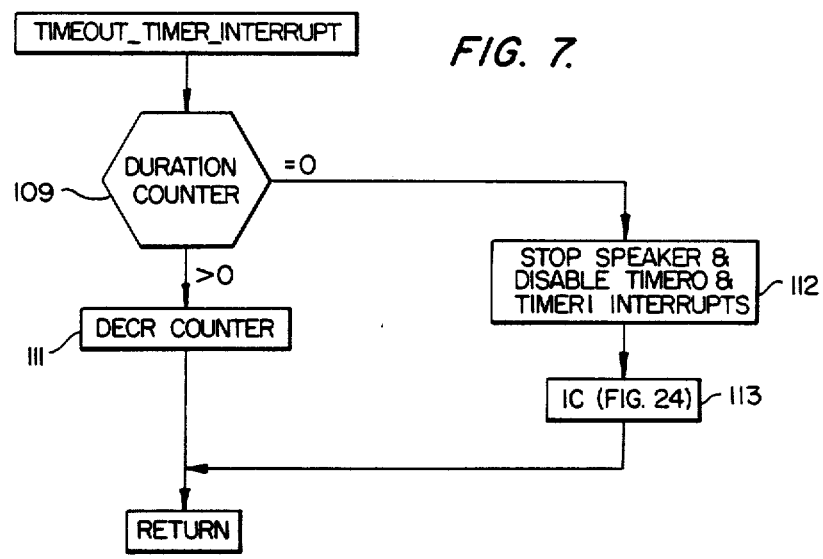
FIG. 7 is a flow chart depicting the flow of control in the servicing routine for a TIMEOUT_TIMER_INTERRUPT request detected in FIG. 2.
Figure 8:
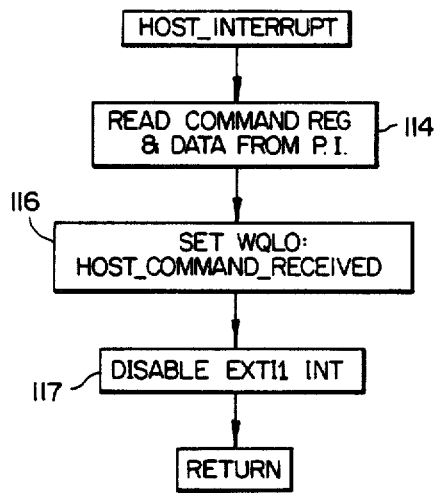
FIG. 8 is a flow chart depicting the flow of control in the servicing routine for a HOST_INTERRUPT request detected in FIG. 2.
Figure 11:
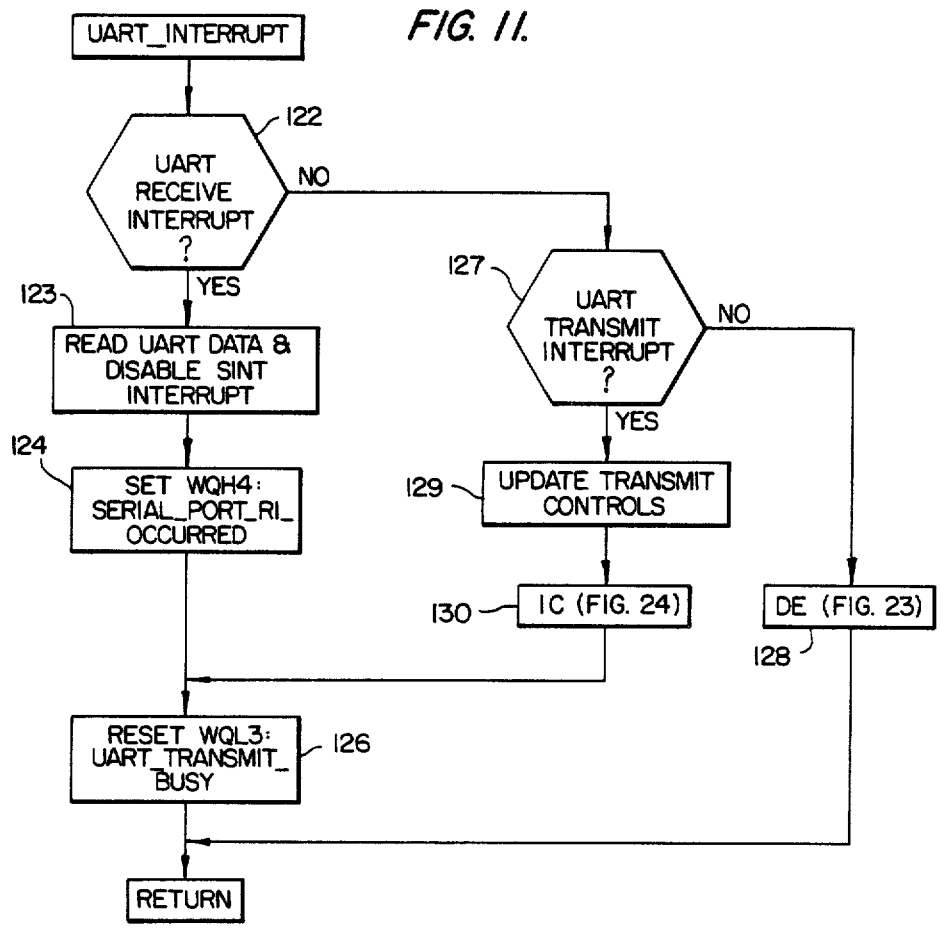
FIG. 11 is a flow chart depicting the flow of control in the servicing routine for a UART_INTERRUPT request detected in FIG. 2.

If low priority interrupts TIMER0, EXTI1, or SINT are detected by block 50, control is transferred to blocks 54, 56, or 62, respectively, and the program steps shown in FIGS. 7, 8, or 11, respectively, are executed.

Figure 9:
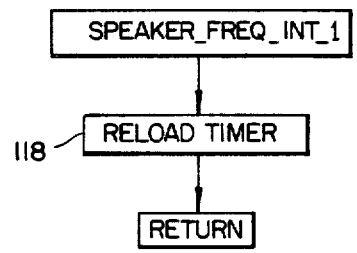
FIG. 9 is a flow chart depicting the flow of control in the servicing routine for a SPEAKER_FREQUENCY_INTERRUPT_1 request detected in FIG. 2.
Figure 10:
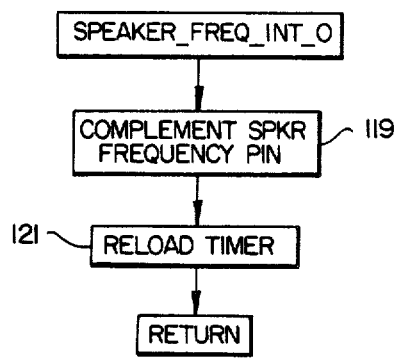
FIG. 10 is a flow chart depicting the flow of control in the servicing routine for a SPEAKER_FREQUENCY_INTERRUPT_0 request detected in FIG. 2.

If low priority interrupt TIMER1 is detected by block 50, control is transferred to block 57 where a speaker frequency counter (not shown) internal to microcontroller 36 (FIG. 1) is decremented by "1". Control is then transferred to decision block 58 to determine if the value of the speaker frequency counter is greater than or equal to zero. If greater than zero, control is transferred to block 59 where the program steps shown in FIG. 9 are executed. If equal to zero, control is transferred to block 61 where the program steps of FIG. 10 are executed.

At the completion of each of the servicing routines shown in FIGS. 5-11, the regular program count is popped from stack memory and placed back into the program counter so that regular processing can continue.

Referring now to FIG. 3, when the communications adapter shown in FIG. 1 is reset, for example, when power is initially applied to the system, control will reside in reset block 63. Control is then transferred to block 64 where system diagnostics are performed and where certain initialization procedures are followed. Control is then transferred to block 66 where the main processing loop is entered.

Generally, regular processing in the adapter of FIG. 1 is occupied by checking the status of each bit of twelve-bit work queue register 46 shown in FIG. 1 within RAM 40. The sequence of checking the work queue register is commanded by the programs shown in FIGS. 3 and 4. Work queue register 46 is divided into six high priority work item bits and six low priority work item bits. When checking the work item bits, each high priority work item bit is checked before the first low priority bit. Then each high priority bit is again checked before the second low priority bit, and so forth.

In detail, the main loop is started with control in decision block 67 where it is decided if any high priority work items, represented by high priority bits in work queue register 46 (FIG. 1), are in queue. If there are no high priority work items in queue, control is transferred to block 68 where the first low priority work item is checked. The operation of block 68 is described in detail below with reference to FIG. 4.

Figure 12:
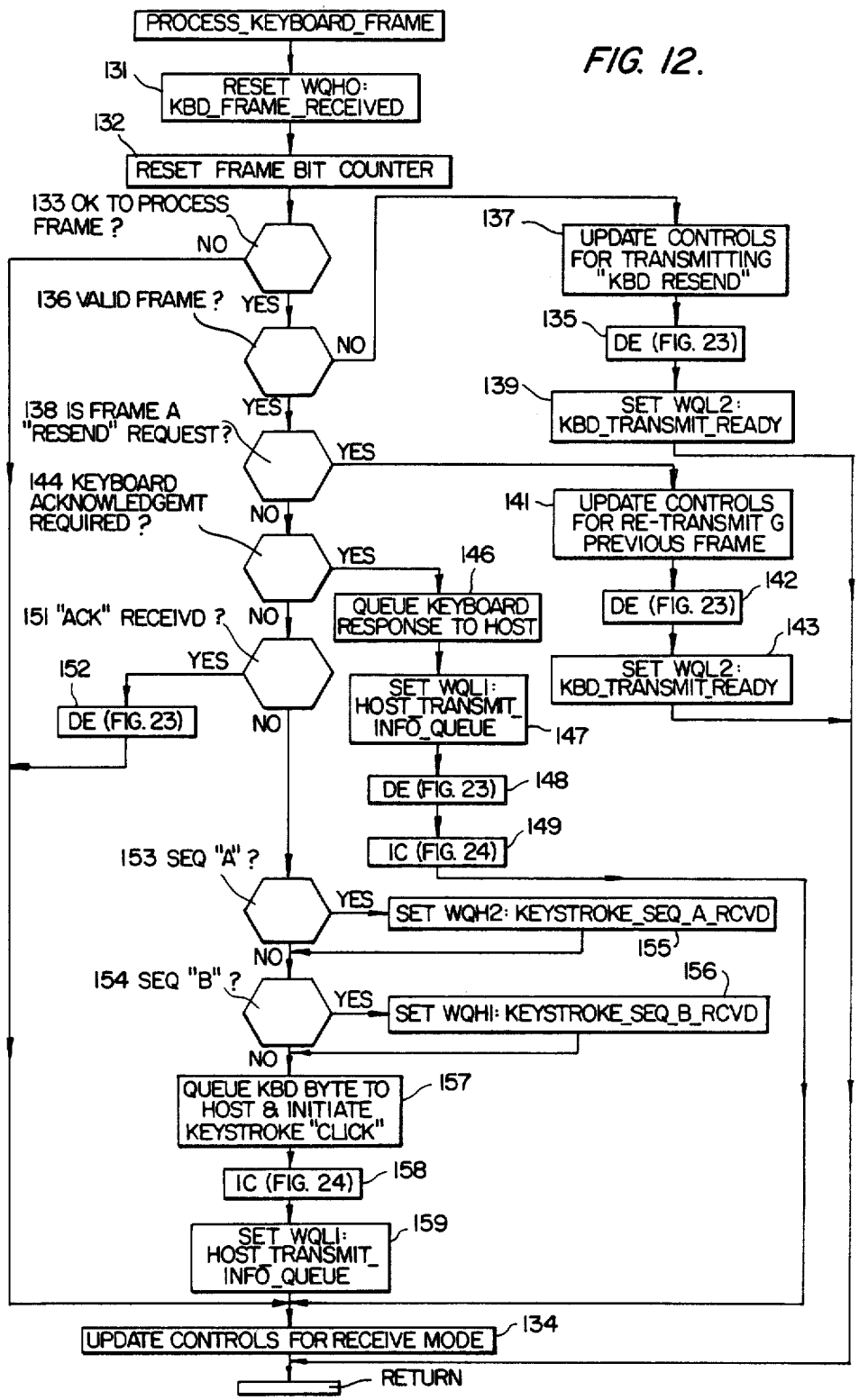
FIG. 12 is a flow chart depicting the flow of control to perform the work item PROCESS_KEYBOARD_FRAME detected in FIG. 3.

If decision block 67 discovers high priority work items in queue, control is transferred sequentially to decision blocks 69-73. If decision block 69 detects that the first high priority work queue bit WQH0 is set, control is transferred to block 74 and the program steps shown in FIG. 12 are executed. Control is then looped back to decision block 67 to decide if any more high priority work items are in queue.

Figure 13:
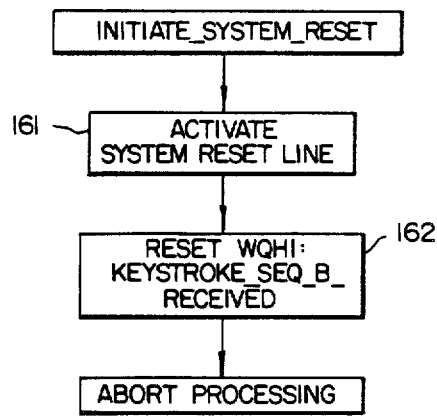
FIG. 13 is a flow chart depicting the flow of control to perform the work item INITIATE_SYSTEM$_{13}$ RESET detected in FIG. 3.

If decision block 69 detects that work queue bit WQH0 is not set, control is transferred to decision block 70 where work queue bit WQH1 is checked. If bit WQH1 is present, control is transferred to block 75 where the program steps shown in FIG. 13 are executed. As will be described in detail with respect to FIG. 13, processing is eventually aborted in block 75 and control is not returned to block 67.

In a manner similar to the operation of decision block 69, decision blocks 71-73 check the status of high priority work queue bits WQH2, WQH4 and WQH5, respectively. If the respective work queue bits are detected by blocks 71-73, control is transferred to blocks 76-78, respectively, to execute the program steps shown in FIGS. 14-16, respectively.

Here it should be noted that the preferred embodiment does not use high priority work queue bit WQH3. This is because only five high priority work items are necessary to satisfy the specific requirements of the preferred embodiment. This fact, and the fact that a twelve bit work queue register is used with six high priority bits and six low priority bits should not be construed to delimit the invention in any manner. It will be understood by a skilled artisan that the present invention can be used to enqueue work items of an arbitrary number. In addition, the fact that only two work item priority levels are described in the preferred embodiment will not be construed to place limitations on the invention. One skilled in the art will appreciate that any number of work item priority levels may be used without departing from the spirit and scope of the present invention.

Figure 17:
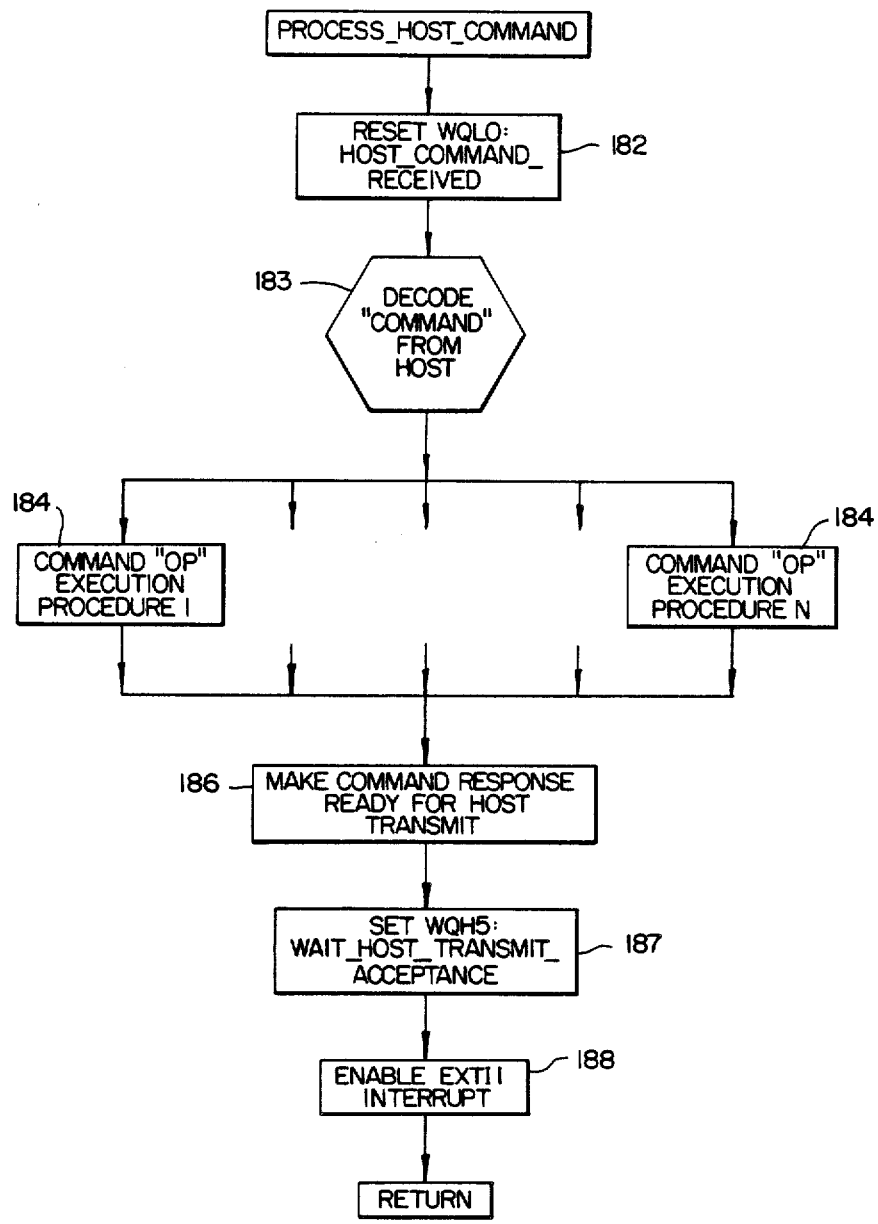
FIG. 17 is a flow chart of the flow of control to process the work item PROCESS_HOST_COMMAND detected in FIG. 4.

Referring now to FIG. 4 to describe low priority work queue bit checking, control begins in block 81 having been transferred from block 67 of FIG. 3. Control is transferred to block 82 where the value of the work queue low pointer is determined. The work queue low pointer is an integer having a value of from 0 to 5. During system initialization (Block 64, FIG. 3), the work queue low pointer is set to "0" so that the first time decision block 82 is addressed, control will be transferred to decision block 83 where the status of low priority work queue bit WQL0 is checked. If bit WQL0 is detected, control is transferred to block 84 where the processing steps shown in FIG. 17 are performed.

After block 84 is finished, control is transferred to block 86. If decision block 83 does not detect the presence of bit WQL0, control is transferred directly to block 86 without first activating block 84. Block 86 then increments the value of the work queue low pointer by "1" so that it now holds the value "1". Control is then transferred from block 86 to block 67 (FIG. 3) for continued processing.

The next time the routine of FIG. 4 is activated by block 67 of FIG. 3, decision block 82 will decode work queue low pointer to be the value "1" and will transfer control to block 87 to check the status of low priority work queue bit WQL1. If bit WQL1 is detected, control is transferred to block 88 for executing the program steps shown in FIG. 18. Else, control is transferred directly to block 86 for incrementing the work queue low pointer. After block 88 completes execution, control is also transferred to block 86. Block 86 then increments the work queue low pointer to the value "2".

Each time block 86 is activated, the work queue low pointer is incremented by "1". If the pointer holds the value "5", block 86 rolls the pointer over to the value "0". By this means, each time block 67 of FIG. 3 activates the WORKQ LOW TEST routine of FIG. 4, only one low priority work queue bit is checked depending on the value of the work queue low pointer. If the work queue low pointer is decoded by block 82 to be the value 2, 3, 4, or 5, control is transferred to blocks 89, 90, 91, or 92, respectively where low priority work queue bits WQL2, WQL3, WQL4, or WQL5, respectively, are checked. If the respective work queue bits are detected, blocks 89-92 transfer control to blocks 93-96, respectively, to execute the program steps shown in FIGS. 19-22, respectively. If the respective work queue bits are not detected, decision blocks 89-92 transfer control directly to block 86 for incrementing the work queue low pointer.

As a result of the foregoing, the main programming loop shown in FIGS. 3 and 4 checks work queue register 46 (FIG. 1) in a predetermined priority sequence and performs work items corresponding to detected work queue bits. The main loop of FIGS. 3 and 4 is interrupted during the servicing of interrupt requests as shown in FIG. 2.

Figure 21:
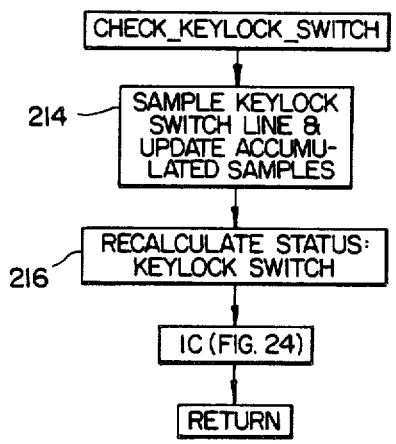
FIG. 21 is a flow chart of the flow of control to process the work item CHECK_KEYLOCK_SWITCH detected in FIG. 4.
Figure 22:
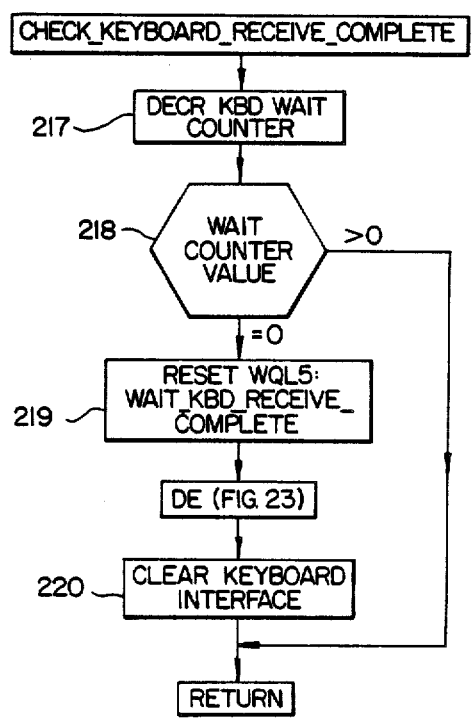
FIG. 22 is a flow chart of the flow of control to process the work item CHECK_KEYBOARD_RECEIVE_COMPLETE detected in FIG. 4.
Figure 23:
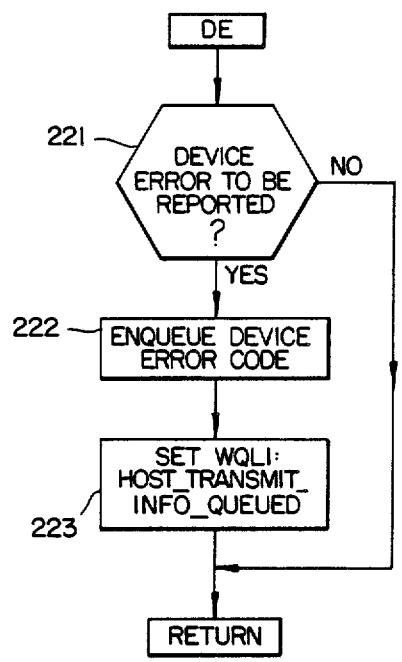
FIG 23 is a flow chart of the flow of control of the conditional device error enqueueing procedure according to this invention.
Figure 24:
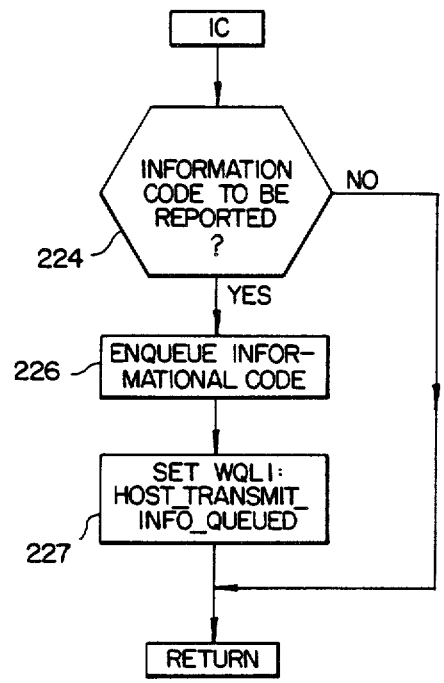
FIG. 24 is a flow chart of the flow of control of the conditional information code enqueueing procedure according to this invention.

The individual work queue bits in work queue register 46 are set and reset by interrupt servicing routines shown in FIGS. 5-11 as well as by work item routines shown in FIGS. 12-22, and by conditional routines shown in FIGS. 23 and 24.

Figure 5:
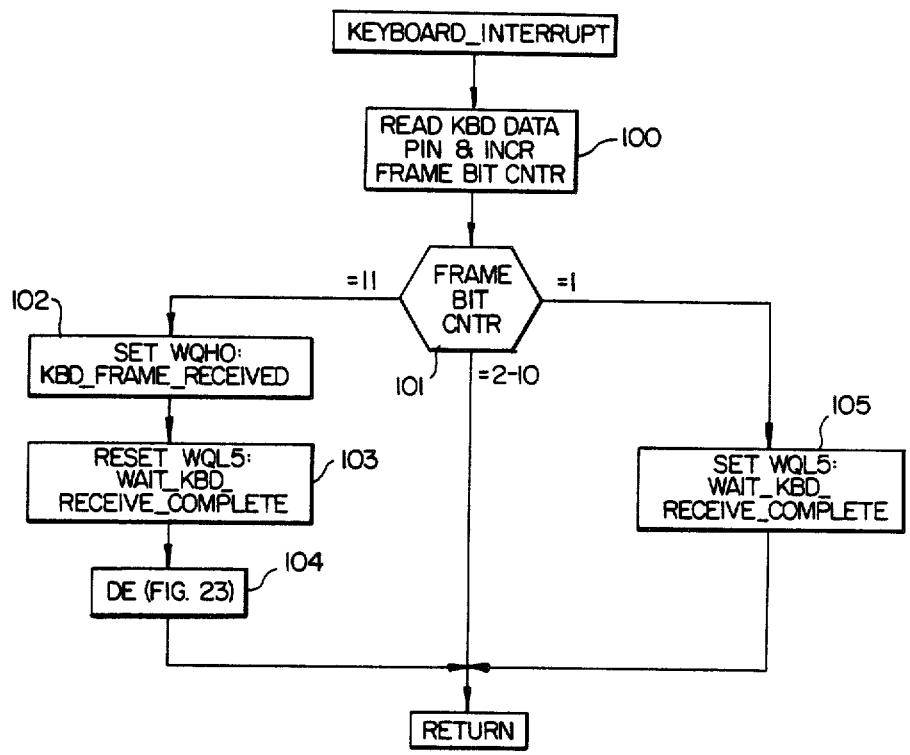
FIG. 5 is a flow chart depicting the flow of control in the servicing routine for a KEYBOARD_RECEIVE_INTERRUPT request detected in FIG. 2.

Referring to FIG. 5, interrupt servicing routine KEYBOARD_INTERRUPT is shown. This routine is activated when microcontroller 36 of FIG. 1 receives the high priority interrupt request EXTI0 indicating that a bit of a keyboard frame is being sent from keyboard 33 to microcontroller 36. Control begins at block 100 where the keyboard data pin is read and the value is stored in a keyboard frame buffer. A keyboard frame bit counter is then incremented and control is transferred to decision block 101 to determine the count of the keyboard frame bit counter. If the frame bit counter is "1", indicating that the first bit of a frame has been received, control is transferred to block 105. Block 105 sets low priority work queue bit WQL5 and then returns control to regular processing. If the frame bit count is between 2 and 10, block 101 causes the servicing routine to be exited immediately and regular processing is reinstated.

If block 101 detects that the frame bit count is 11, indicating that an entire frame has been received, control is transferred to block 102 and then to 103 where work queue bit WQH0 is set and bit WQL5 is reset, respectively. Control is then transferred to block 104 where the device error (DE) routine of FIG. 23 is executed. The servicing routine is then exited and regular processing is reinstated.

Here it should be noted that instead of interrupting regular processing while receiving and processing a frame of bits from the keyboard, the present invention interrupts regular processing only as long as it takes to read and store each individual bit within the frame. All other work items required to be completed to receive a keyboard frame are deferred until regular processing is reinstated so that the communications adapter can be more responsive to other interrupt requests.

Figure 6:
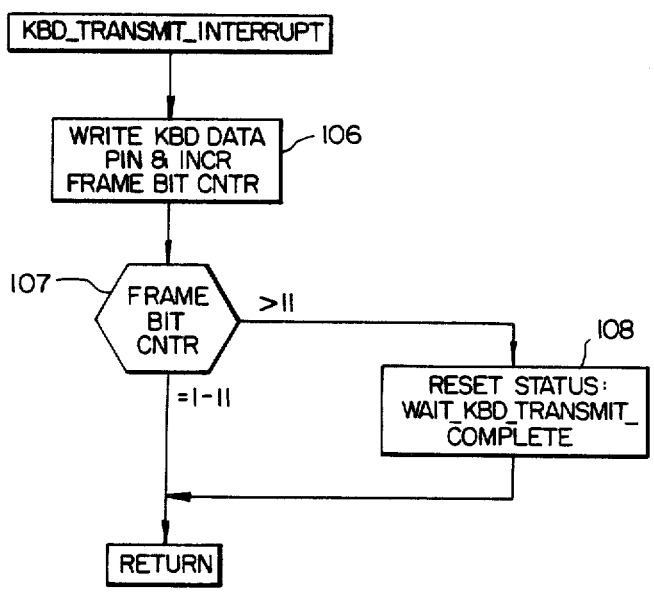
FIG. 6 is a flow chart depicting the flow of control in the servicing routine for a KEYBOARD_TRANSMIT_INTERRUPT request detected, in FIG. 2.

Referring now to FIG. 6, the interrupt servicing routine KEYBOARD_TRANSMIT_INTERRUPT is shown. This routine is activated when microcontroller 36 of FIG. 1 receives the high priority interrupt request EXTI0 indicating that keyboard 33 is ready to receive a bit of data from microcontroller 36. Here, control begins at block 106 where a data bit is written to the keyboard data pin and the keyboard frame bit counter is incremented. Control is then transferred to decision block 107 where the value of the frame bit counter is determined. If the value is from 1 to 11, the servicing routine is exited and regular processing is reinstated. If the frame bit counter is greater than 11, indicating that the entire frame has been transmitted to the keyboard, control is transferred to block 108 where a status bit WAIT_KEYBOARD_TRANSMIT_COMPLETE, indicating that a keyboard transmission is in process (set in FIG. 19), is reset. The servicing routine is then exited and regular processing is resumed.

Referring now to FIG. 7, the TIMEOUT_TIMER_INTERRUPT servicing routine is shown. This routine is activated when microcontroller 36 of FIG. 1 receives the low priority interrupt TIMER0 indicating that the time increment of a speaker tone has expired and that the speaker should be turned off if no other time increments remain. Control begins in block 109 where a speaker duration counter is sensed. If the value of the counter is greater than "0", control is transferred to block 111 where the duration counter is decremented by "1" and control is returned to regular processing. If block 109 detects that the duration counter has reached "0", control is transferred to block 112 where the speaker is stopped and where the microcontroller interrupts TIMER0 and TIMER1 are disabled. Control is then transferred to block 113 where the conditional information code (IC) procedure of FIG. 24 is executed. Regular processing is then reinstated. This routine allows a number of time increments, equal to the number initially stored in the duration counter, to expire before stopping the speaker request thereby extending the timing capabilities of internal timer TIMER0.

Referring to FIG. 8, the HOST_INTERRUPT servicing routine is detailed with control beginning in block 114. This routine is activated when microcontroller 36 of FIG. 1 receives low priority interrupt request EXTI1 indicating that host 30 wishes to send data to microcontroller 36. Block 114 reads command register 38 as well as host generated data from peripheral interface circuit 37 (both shown in FIG. 1). Control is then transferred to block 116 where low priority work queue bit WQL0 is set. Microcontroller interrupt EXTI1 is then disabled by block 117 before control is returned to regular processing.

FIGS. 9 and 10 show the interrupt servicing routines for SPEAKER_FREQUENCY_INTERRUPT_1 and SPEAKER_FREQUENCY_INTERRUPT_0, respectively. Each are activated when microcontroller 36 of FIG. 1 receives low priority interrupt request TIMER1 indicating that the signal sent to the speaker should be complimented. In the INTERRUPT_1 routine a speaker frequency timer is reloaded by block 118 before control is returned, whereas in the INTERRUPT_0 routine, the speaker frequency pin is complemented by block 119 and then the speaker frequency timer is reloaded by block 121 before returning control to regular processing. These routines drive speaker 32 (FIG. 1) with a square wave by timing half a square wave period before complementing the speaker pin and timing another half period.

Since counter 58 of FIG. 1 only activates the complementing routine INTERRUPT_0 when the frequency count equals "0", a number of time increments, equal to the count initially stored in the frequency counter, can expire before complementing the speaker frequency pin thereby extending the timing capabilities of internal timer TIMER1.

The final interrupt servicing routine is the UART_INTERRUPT routine shown in FIG. 11. This routine is activated when microcontroller 36 of FIG. 1 receives low priority interrupt SINT indicating that a frame of data is to be sent to or received from mouse 31 by UART 42. Control begins in decision block 122 where it is determined if a UART receive interrupt has been received. If so, control is transferred to block 123 where the data is read from the UART and where microcontroller interrupt SINT is disabled. Control is then passed to block 124 where high priority work queue bit WQH4 is set. Control is then transferred to block 126 where the low priority work queue bit WQL3 is reset before returning control back to regular processing.

If decision block 122 determines that a UART receive interrupt has not been received, control is transferred to decision block 127 to determine if a UART transmit interrupt has been received. If not, control is transferred to block 128 to perform the DE routine of FIG. 23 before reinstanting regular processing. Else, control is passed to block 129 where transmit controls are updated to reflect the received interrupt before transferring control to block 130 for executing the IC routine. Control is then transferred to block 126 to reset bit WQL3 before returning control to regular processing.

FIGS. 12-22 show the eleven work item routines of the preferred embodiment. These work items are performed during regular processing as determined by work queue register 46 (FIG. 1) which is interrogated by the programs of FIGS. 3 and 4 described earlier. These work items are required to be performed to completely satisfy the five interrupt requests. However, it has been determined that these eleven work items can be performed at a time later than the performance of the respective interrupt servicing routines (FIGS. 5-11). Here it should be noted that the work queue bits in work queue register 46 corresponding to each work item can be set and reset by an interrupt servicing routine (FIGS. 5-11), or by the execution of an individual work item (FIGS. 12-22), or by the conditional routines (FIGS. 23, 24).

The priority of performance of each individual work item is chosen to optimize system performance. For example, within the environment of the communications adapter of the preferred embodiment, blocks 74 and 77 of FIG. 3, representing the routines of FIGS. 12 and 15 respectively, are given high priority in order to clear the frame buffers contained within UART 42 and port 44 (FIG. 1) as soon as possible. This practice avoids collisions between data presently stored in the frame buffers and incoming data. On the other hand, blocks 84 and 95 of FIG. 4, representing the routines of FIGS. 17 and 21, respectively, are given low priority. In the case of the PROCESS_HOST_COMMAND routine of FIG. 17, host 30 of FIG. 1 is an intelligent source that can recognize that microcontroller 36 is not ready to receive a command and can defer sending that command. Similarly, keylock switch 34 of FIG. 1 is a mechanical switch that is capable of being actuated much slower than the possible sampling rate of microcontroller 36. Therefore, sampling keylock line 47 in the routine of FIG. 21 can be delayed without affecting system performance.

Referring to FIG. 12, work item PROCESS_KEYBOARD_FRAME is shown which is activated when block 69 of FIG. 3 determines that high priority work queue bit WQH0 is set. Control begins in block 131 where work queue bit WHQ0 is reset. Block 132 then resets the frame bit counter before passing control to decision block 133. Block 133 determines if it is the proper time to process the keyboard frame. If not, control is transferred to block 134 where the controls are updated for keyboard receive mode. If it is the proper time to process the keyboard frame, control passes from block 133 to block 136 where it is decided if a valid frame has been received from the keyboard. If not, control is transferred to block 137. Blocks 137, 135, and 139 are then executed to send a "resend" command to the keyboard. In the process, block 139 sets low priority work queue bit WQL2.

If a valid frame has been received, control passes from block 136 to block 138 to determine if the keyboard frame contains a "resend" request from the keyboard. If it does, control is transferred to the series of blocks 141, 142, and 143 where the previous frame transmitted to the keyboard is prepared to be retransmitted. In the process, block 143 sets low priority work queue bit WQL2.

If block 138 determines that the frame does not contain a "resend" request, control passes to block 144 where it is determined if keyboard acknowledgement is required. If acknowledgement is required, control passes to the series of blocks 146, 147, 148, and 149 where the keyboard response is queued for transmission to the host. During this response queueing, block 147 sets low priority work queue bit WQL1. Block 149 then passes control to block 134 before returning control back to the main loop of regular processing.

If acknowledgement is not required, block 144 passes control to block 151 to determine if, even though acknowledgement is not required, acknowledgement has been received. If yes, control is transferred to block 152 to execute the DE routine of FIG. 23. If the keyboard has not sent an acknowledgement, control passes from block 151 to decision blocks 153 and 154 to determine if special keystroke sequences "A" or "B" have been received.

If block 153 determines that keystroke sequence "A" has been received, control passes to block 155 where high priority work queue bit WQH2 is set. If block 154 determines that keystroke sequence "B" has been received, control passes to block 156 where high priority work queue bit WQH1 is set.

Control then passes to block 157 where the keyboard frame is queued for transmission to the host and where an audible key click is generated. Control then passes to block 158 for execution of the IC routine of FIG. 24, and then to block 159 where the low priority work queue bit WQL1 is set. Control then passes to block 134 and then back to block 67 of FIG. 3.

Special keystroke sequence "B" is used in the preferred embodiment as a user request for a system reset, and special sequence "A" is used as a user request to set a system trap.

Figure 14:
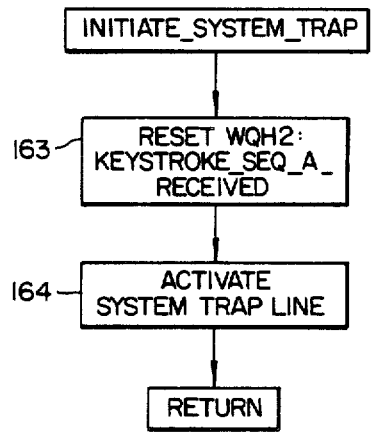
FIG. 14 is a flow chart depicting the flow of control to perform the work item INITIATE_SYSTEM_TRAP detected in FIG. 3.

FIGS. 13 and 14 show the work items for INITIATE_SYSTEM_RESET and INITIATE_SYSTEM_TRAP activated by the work queue bits WQH1 and WQH2, respectively. In FIG. 13, block 161 activates system reset line 49 on microcontroller 36 (FIG. 1). Block 162 then resets work queue bit WQH1. Processing is then aborted. In FIG. 14, block 163 resets work queue bit WQH2 and block 164 activates system trap line 48 of microcontroller 36 (FIG. 1). Control is then returned to block 67 of FIG. 3.

Figure 15:
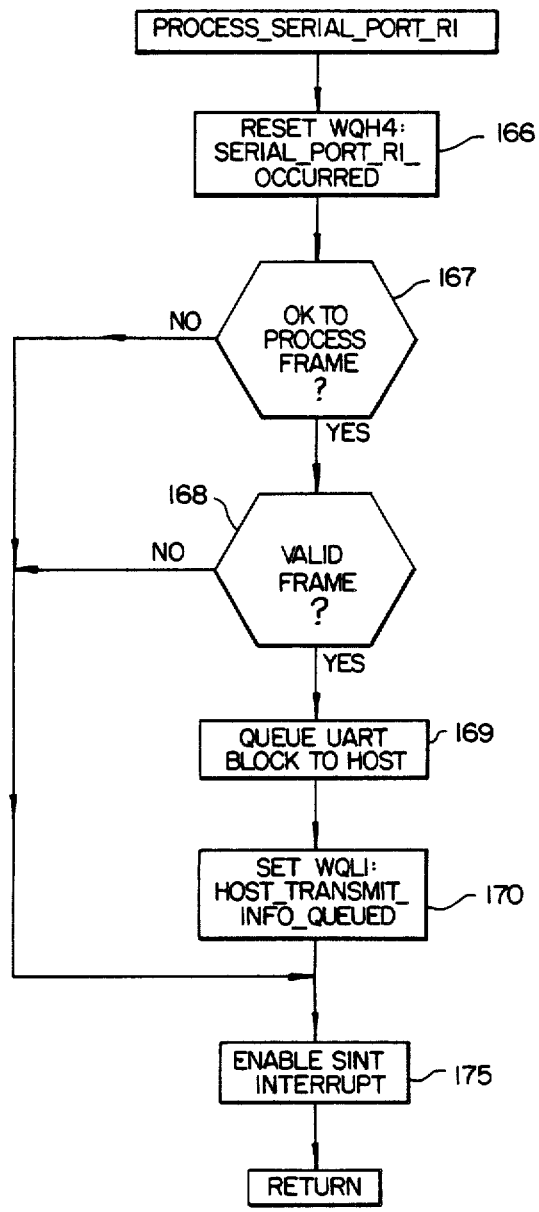
FIG. 15 is a flow chart depicting the flow of control to perform the work item PROCESS_SERIAL_PORT_RI detected in FIG. 3.

FIG. 15 shows the work item PROCESS_SERIAL_PORT_RI which is activated when block 72 of FIG. 3 determines that high priority bit WQH4 is set.

Block 166 resets bit WQH4 and passes control to decision block 167 to determine if it is the proper time to process the UART frame. If not, control is passed to block 175 where the SINT interrupt of microcontroller 36 (FIG. 1) is enabled before returning control back to block 67 of FIG. 3.

If block 167 determines that it is the proper time to process the UART frame, control is transferred to block 168 where it is determined if a valid frame has been received from the UART. If yes, control passes to block 169 where the information received from the UART is queued for transmission to the host. If not, control passes to block 175 for operation identical to that described above.

After block 169 queues the UART information for transmission to the host, control is transferred to block 170 where low priority work queue bit WQL1 is set. Control then passes to block 175 and then control returns to block 67 of FIG. 3.

Figure 16:
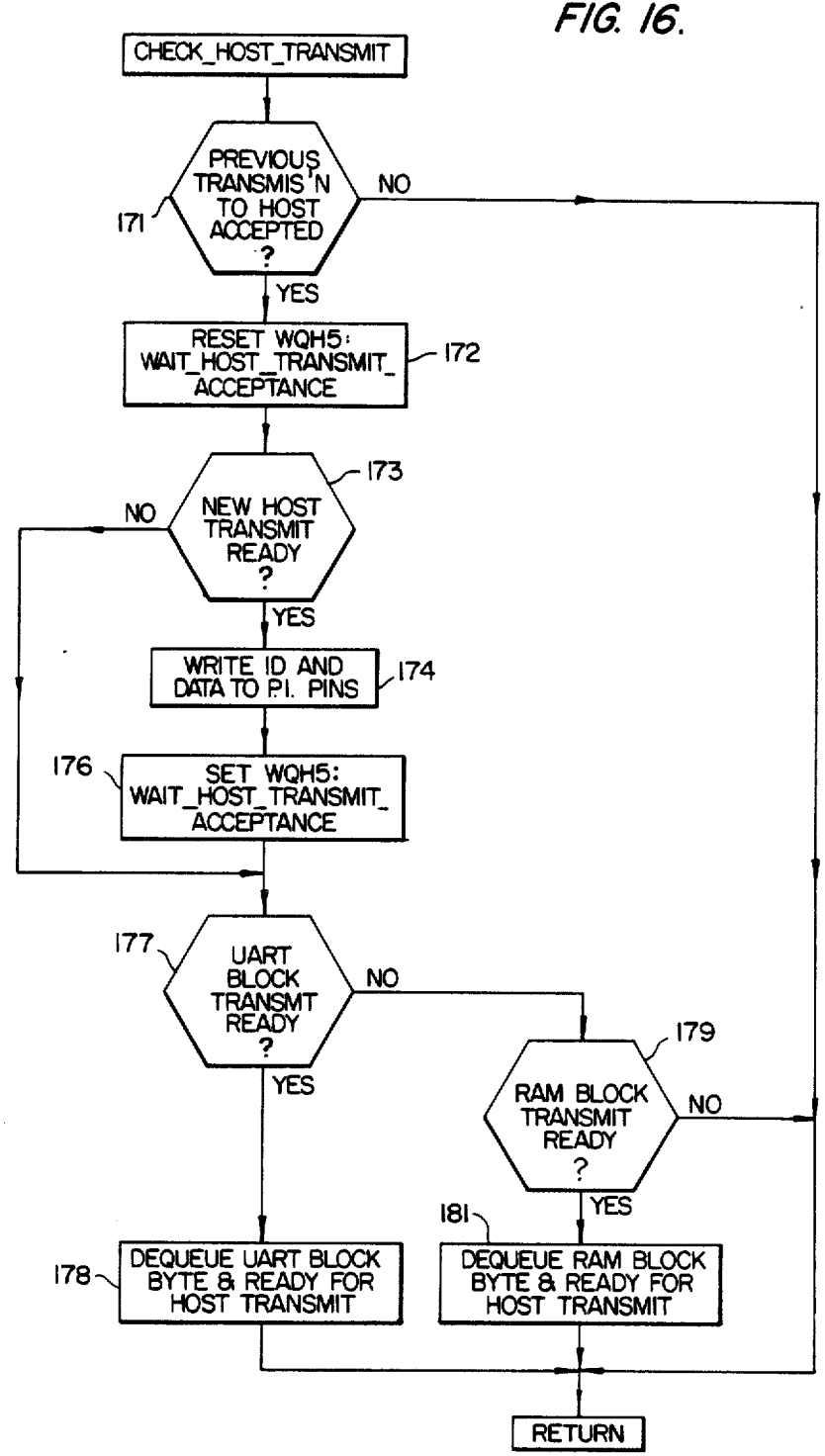
FIG. 16 is a flow chart of the flow of control to process the work item CHECK_HOST_TRANSMIT detected in FIG. 3.

Referring now to FIG. 16, the work item CHECK_HOST_TRANSMIT is shown. This work item is activated when block 73 of FIG. 3 recognizes that bit WQH5 of work queue register 46 (FIG. 1) is set.

Control begins in block 171 where it is determined if the previous transmission to the host has been accepted. If not, control is immediately returned to block 67 of FIG. 3. If the previous host transmission was accepted, control is transferred from block 171 to block 172 where work queue bit WQH5 is reset.

Control then passes to block 173 to determine if a new host transmission is ready. If yes, control is transferred to block 174 where source identification and data are written to the pins of peripheral interface circuit 37 (FIG. 1). Control then passes to block 176 where work queue bit WQH5 is set. Control is then transferred to decision block 177 which is where control is directly transferred if decision block 173 determines that there is no new host transmission ready.

If decision block 177 determines that the UART block is ready for transmission, control is transferred to block 178 where the UART block byte is dequeued and made ready for transmission to the host. If decision block 177 determines that the UART block is not ready for transmission, control passed to decision block 179 where it is determined if a RAM block is ready for transmission to the host. A RAM block is a plurality of bytes stored in RAM 40 of FIG. 1 containing information that can be requested by and sent to host 30. For example, a block of bytes in RAM 40 can be used to store a history of device errors that can be used by host 30 for diagnostic purposes. If a RAM block is not ready for transmission, control is immediately returned to block 67 of FIG. 3. If yes, control passes from block 179 to block 181 where the RAM block is dequeued and made ready for transmission to the host. When the work item CHECK_HOST_TRANSMIT is completed, control passes to block 67 of FIG. 3.

FIG. 17 shows the work item PROCESS_HOST_COMMAND which is initiated when block 83 of FIG. 4 recognizes the presence of low priority work queue bit WQL0. Control begins in block 182 where bit WQL0 is reset before passing control to decision block 183 where the host command is decoded. Block 183 then activates one of blocks 184 to perform the proper function to satisfy the decoded host command. Control then passes to block 186 where the proper host command response is made ready for transmission back to the host. Block 187 then sets high priority work queue bit WQH5 and passes control to block 188 where microcontroller 36 (FIG. 1) interrupt EXTI1 is enabled. Control is then returned to block 86 of FIG. 4.

Figure 18:
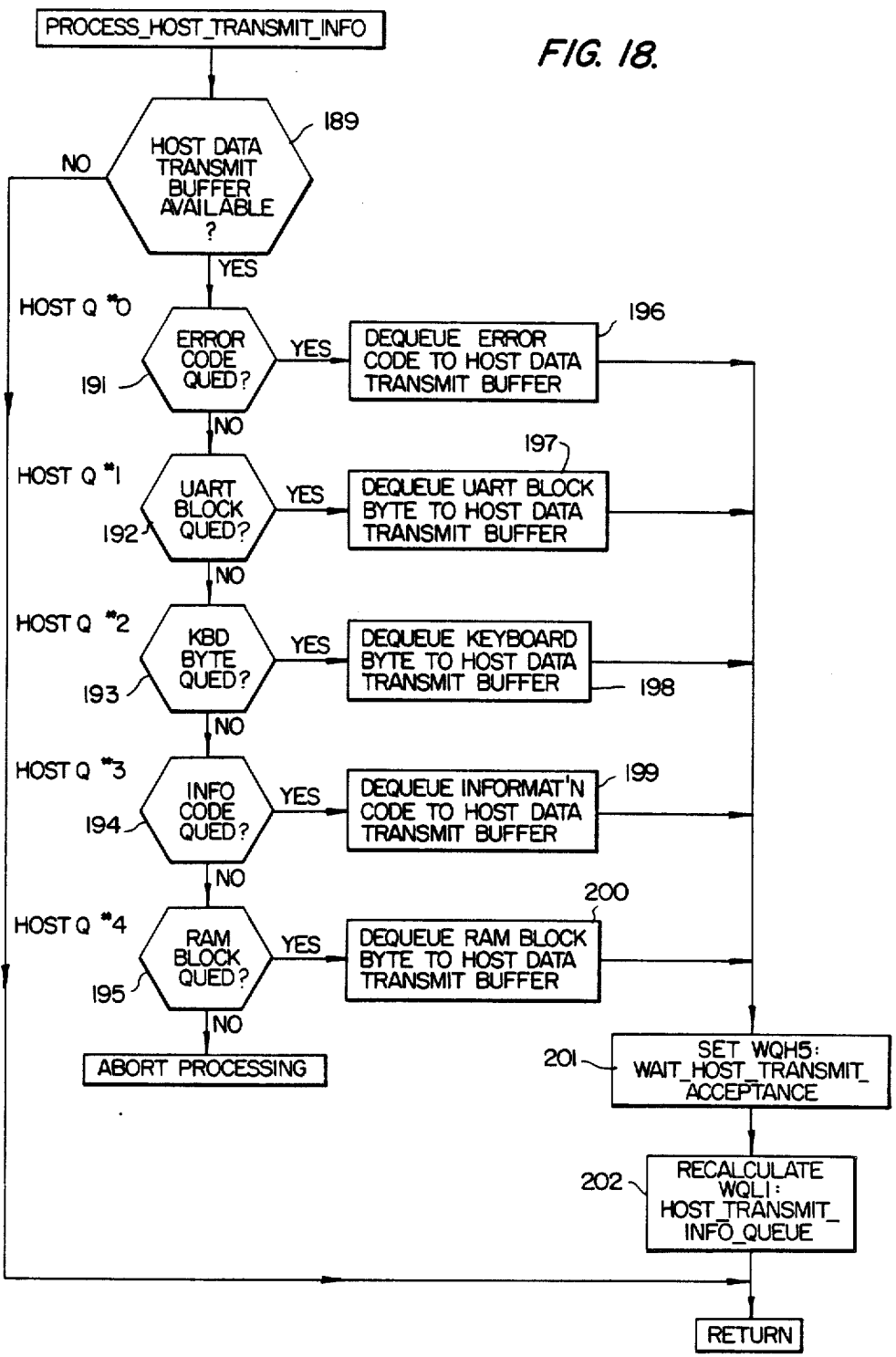
FIG. 18 is a flow chart of the flow of control to process the work item PROCESS_HOST_TRANSMIT_INFO detected in FIG. 4.

FIG. 18 shows the work item PROCESS_HOST_TRANSMIT_INFORMATION which is activated when decision block 87 of FIG. 4 recognizes the presence of low priority work queue bit WQL1.

Control begins in decision block 189 where the availability of the host data transmission buffer is checked. If the buffer is not available, control is immediately returned to block 86 of FIG. 4. If the buffer is available, data can be accepted from one of five different sources within microcontroller 36 (FIG. 1). This data includes: a device error code; a UART block; a keyboard byte; an information code; or a RAM block. These data sources are checked in this priority order by decision blocks 191-195. When one of decision blocks 191-195 detects the presence of queued data from the respective source, control is transferred as shown to one of blocks 196-200, respectively. If none of decision blocks 191-195 indicates that data is queued for transmission to the host, processing is aborted.

When the active one of blocks 196-200 finishes dequeueing data to the host transmission buffer, control passes to block 201 where high priority work queue bit WHQ5 is set. Control then passes to block 202 where it is decided if work queue bit WQL1 should remain set. If other data remains to be transmitted to the host, bit WQL1 remains set. Otherwise, bit WQL1 is reset. Control is then passed to block 86 of FIG. 4.

Figure 19:
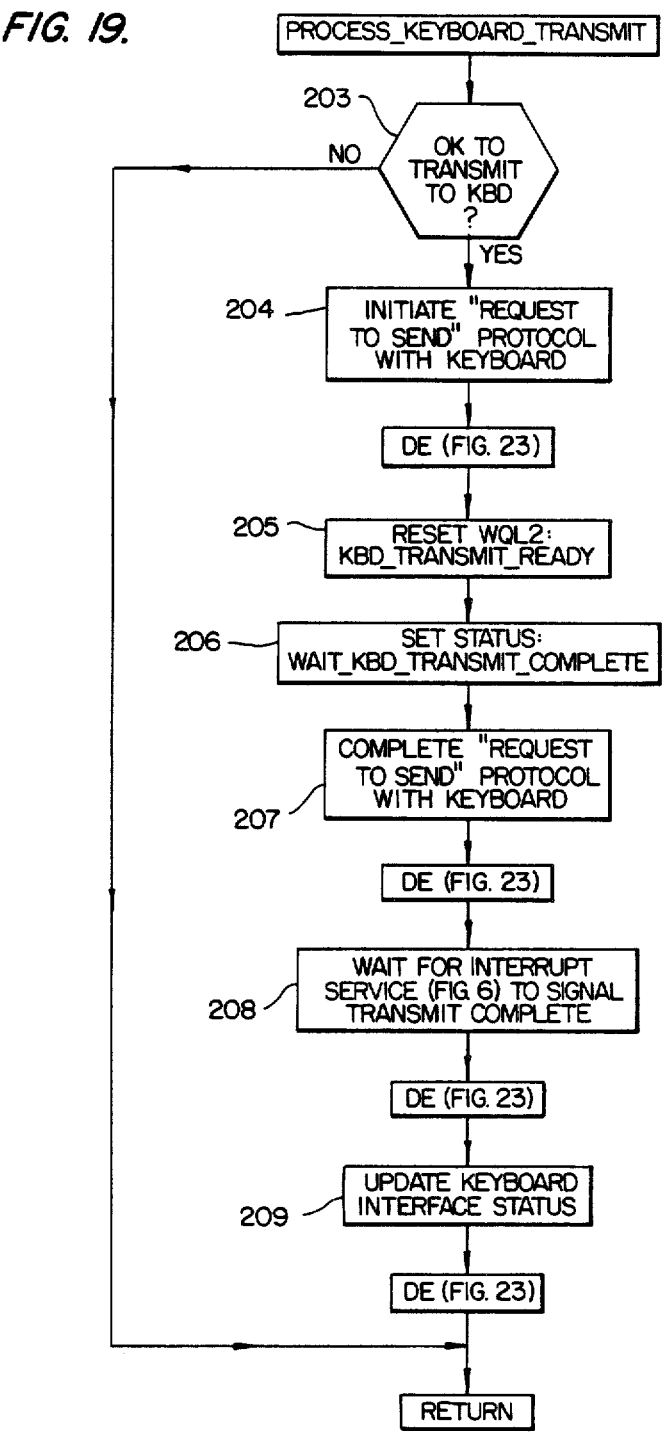
FIG. 19 is a flow chart of the flow of control to process the work item PROCESS_KEYBOARD_TRANSMIT detected in FIG. 4.

FIG. 19 shows the work item PROCESS_KEYBOARD_TRANSMIT which is activated when block 89 of FIG. 4 determines that work queue bit WQL2 is set. Control begins in block 203 where it is determined if it is the proper time to transmit data to the keyboard. If not, execution of the work item is stopped and control passes to block 86 of FIG. 4. If block 203 decides affirmatively, control passes to block 204 where "request to send" protocol is initiated between microcontroller 36 and keyboard 33 (both shown in FIG. 1). The DE routine of FIG. 23 is then executed to report errors discovered by block 204. Then, work queue bit WQL2 is reset by block 205.

Block 206 then sets status WAIT_KEYBOARD_TRANSMIT_COMPLETE and passes control to block 207 where "request to send" protocol is completed. The DE routine is again executed and then block 208 awaits for the status bit WAIT_KEYBOARD_TRANSMIT_COMPLETE to be reset by the interrupt servicing routine of FIG. 6 indicating that the transmission to the keyboard is complete.

The DE routine is then executed again, followed by an update of the keyboard interface status by block 209, followed by another execution of the DE routine. When work item PROCESS_KEYBOARD_TRANSMIT is completed, control passes to block 86 of FIG. 4.

Figure 20:
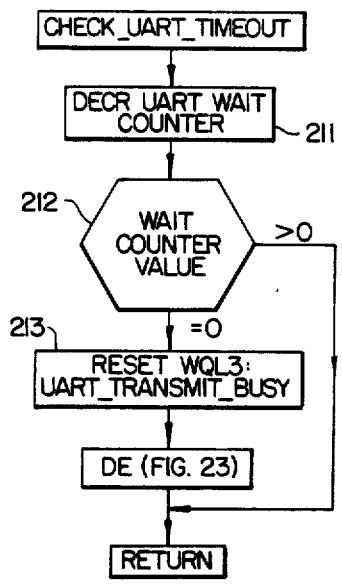
FIG. 20 is a flow chart of the flow of control to process the work item CHECK_UART_TIMEOUT detected in FIG. 4.

FIG. 20 shows the work item CHECK_UART_TIMEOUT which is activated when decision block 90 of FIG. 4 detects that low priority work queue bit WQL3 is set. Control begins in block 211 where a UART wait counter is decremented by one. Decision block 212 then reads the UART wait counter and returns control to block 86 of FIG. 4 if the count is greater than zero. If the count is equal to zero, indicating that there may be a problem with UART 42 (FIG. 1), block 212 passes control to block 213 where work queue bit WQL3 is reset. The DE routine is then executed to report the potential UART problem to the host. This signifies completion of work item CHECK_UART_TIMEOUT and control returns to block 86 of FIG. 4.

FIG. 21 shows the work item CHECK_KEYLOCK_SWITCH which is activated when decision block 91 of FIG. 4 recognizes the presence of low priority work queue bit WQL4. Control begins in block 214 where the keylock switch line 47 (FIG. 1) is sampled. Control is then passed to block 216 where the status of the keylock switch is calculated. The IC (FIG. 24) routine is then executed to prepare the keylock status for reporting to the host. Control is then passed to block 86 of FIG. 4.

FIG. 22 shows the work item CHECK_KEYBOARD_RECEIVE_COMPLETE which is activated by decision block 92 recognizing that low priority work queue bit WQL5 is set. Control begins in block 217 where a keyboard wait counter is decremented. Decision block 218 then determines the value of the keyboard wait counter and returns control to block 86 of FIG. 4 if the count is greater than zero. If the count is zero, indicating there may be a device error in keyboard 33 (FIG. 1), control is transferred to block 219 where the work queue bit WQL5 is reset. The DE routine is then executed to prepare the keyboard device error for reporting to the host. The keyboard interface is then cleared, including changing the keyboard mode to "receive", in block 220 and control is returned to block 86 of FIG. 4.

FIGS. 23 and 24 shows the conditional device error (DE) and information code (IC) enqueueing routines, respectively. These routines are called periodically throughout the above described interrupt servicing routines (FIGS. 5–11) and work items (FIGS. 12–22) to report device errors or information codes to the host.

Control begins in the DE routine in FIG. 23 at decision block 221 where it is determined if any device errors are to be reported. If not, control is returned to the higher level program that called the DE routine. If a device error is to be reported, control passes to block 222 where the error code is queued for transmission to the host. Block 223 then sets low priority work queue bit WQL1 and returns control to the higher level program.

The IC routine of FIG. 24 begins with control in decision block 224 to determine if any information codes require reporting. If not, control is immediately returned to the higher level program that called the IC routine. If an information code is to be reported, control is passed from block 224 to block 226 where the information code is queued for transmission to the host. Control then passes to block 227 where the low priority work queue bit WQL1 is set. The IC routine is then complete and control returns to the higher level program that called the IC routine.

It will be understood that the preferred embodiment herein presented is for illustrative purposes, and, as such, will not be construed to place limitation on the invention. Those skilled in the art will understand that changes in the form and detail of the preferred embodiment herein disclosed may be made without departing from the spirit and scope of the invention.

I claim:

1. A communication adapter for organizing digital communication with a host processor in response to one of a plurality of interrupt requests, said communication adapter comprising:

a fixed number of receiving means for receiving one of said interrupt requests from a fixed number of interrupt sources, each source having one of a fixed number of interrupt priority levels, including means for generating an interrupt to suspend regular processing and initiate interrupt processing in said communication adapter;

first stage means, being responsive to said means for generating, for identifying and executing immediate attention work item steps to partially satisfy said interrupt request, including means for identifying and queuing predetermined future work item steps, each of which having a priority level, to form a work item queue of arbitrarily assigned high priority and low priority work item steps, said future work item steps to be executed during regular processing in said communication adapter, said work item steps greater in number than said fixed number of receiving means;

reinstating means responsive to said identifying and queuing means for reinstating regular processing in said communication adapter, including means for stepping through said work item queue, such means for stepping being suspended by said means for receiving interrupt requests and execution of immediate attention work items;

executing means, responsive to said means for stepping through, for executing the predetermined future work item steps in the work item queue during regular processing such that all high priority work item steps in the work item queue are completed before any low priority work item steps;

communicating means, responsive to said means for executing the predetermined future work item steps, for communicating a work item result from regular and interrupt processing to said host after all work item steps are completed.

2. A communication adapter as recited in claim 1 wherein the number of work item priority levels is greater than or equal to said fixed number of interrupt priority levels.

3. A communication adapter as recited in claim 2 wherein the means for executing predetermined work items include means for performing each work item of a high priority before any work item of a low priority.

4. A communication adapter as recited in claim 3 wherein a high priority interrupt request from one of said fixed number of interrupt sources suspends the stepping through of said work item queue and stays the receipt of a lower priority interrupt request from one of said fixed number of interrupt sources.

5. A communication adapter as recited in claim 4 wherein a low priority interrupt request from one of said fixed number of interrupt sources suspends the stepping through of said work items but does not stay the receipt of a higher priority interrupt request from one of said fixed number of interrupt sources.

6. A mechanism for organizing digital communication between a host processor and a plurality of input/output devices comprising:

a host processor;

a communication adapter separate from said host processor but in communication therewith;

processing means in said adapter for performing regular processing including executing work item steps in a work item queue in said communication adapter;

input/output devices connected to said adapter for providing interrupting requests;

interrupt means in the adapter for interrupting regular processing in response to one of a plurality of interrupt requests from said input/output devices, said interrupt request indicating a need for communication between said host and one of said input/output devices;

service means in the adapter, responsive to said interrupt means for interrupting, for initiating servicing of said interrupt request by executing immediate attention work item steps and identifying and queuing future work steps in said work item queue that may be executed during regular processing to satisfy said interrupt request; and reinstatement means in the adapter for reinstating regular processing and executing the future work item steps including means for transmitting a work item result from regular and interrupt processing to said host after all work item step processing is completed;

whereby regular processing in said communication adapter is interrupted for a minimum of time while servicing said interrupt request.

7. A communications adapter as recited in claim 6 wherein said processing means executes work items according to predetermined work item priority.

8. A communications adapter as recited in claim 7 wherein said means for servicing said interrupt request executes predetermined work items.

9. A communication adapter as recited in claim 8 wherein said predetermined work item priority is arbitrarily assigned to optimize the performance of said communications adapter.

10. A method of operating an interrupt driven digital processing system using a communication adapter including the steps of:

receiving an interrupt request and interrupting the regular processing in said communication adapter;

servicing said interrupt request by executing immediate attention and identifying and queuing predetermined future work item steps to form a work item queue of arbitrarily assigned high priority and low priority work item steps, said future work items to be executed during regular processing to satisfy said interrupt request;

reinstating regular processing; and executing future work items in said work queue during regular processing;

transmitting the results and interrupt processing to satisfy said request;

whereby regular processing is interrupted for a minimum time while servicing said interrupt request.

11. A method as recited in claim 10 wherein said work items in said queue are executed according to predetermined work item priority.

12. A method as recited in claim 11 wherein all high priority work items in queue are executed before any low priority work items in queue.

13. A method as recited in claim 12 wherein work items are assigned a high priority or a low priority to optimize the performance of said digital processing system.

* * * * *